(12) United States Patent
Kock et al.

(10) Patent No.: US 12,208,970 B2
(45) Date of Patent: Jan. 28, 2025

(54) CONVEYING APPARATUS FOR INDIVIDUALLY SEPARATED PRODUCTS

(71) Applicant: Romaco Kilian GmbH, Cologne (DE)

(72) Inventors: Bernhard Kock, Moers (DE); Martin Baksa, Cologne (DE); Roman Kübler, Duisburg (DE); Mark Strerath, Waldbröl (DE)

(73) Assignee: Romaco Kilian GmbH, Cologne (DE)

( * ) Notice: Subject to any disclaimer, the term of this patent is extended or adjusted under 35 U.S.C. 154(b) by 236 days.

(21) Appl. No.: 17/799,458

(22) PCT Filed: Feb. 15, 2021

(86) PCT No.: PCT/IB2021/051230
§ 371 (c)(1),
(2) Date: Aug. 12, 2022

(87) PCT Pub. No.: WO2021/165807
PCT Pub. Date: Aug. 26, 2021

(65) Prior Publication Data
US 2023/0063559 A1 Mar. 2, 2023

(30) Foreign Application Priority Data
Feb. 17, 2020 (DE) ............ 10 2020 104 063.6

(51) Int. Cl.
*B65G 47/78* (2006.01)
*B30B 15/32* (2006.01)
*B65G 47/84* (2006.01)

(52) U.S. Cl.
CPC .............. *B65G 47/78* (2013.01); *B30B 15/32* (2013.01); *B65G 47/846* (2013.01)

(58) Field of Classification Search
CPC .................................................... B65G 47/80
See application file for complete search history.

(56) References Cited

U.S. PATENT DOCUMENTS 2,362,132 A * 11/1944 Haub .................... C03B 35/08
198/479.1
6,479,777 B2 11/2002 Yamakawa
(Continued)

FOREIGN PATENT DOCUMENTS

CN 205500720 U 8/2016
CN 206966545 U 2/2018
(Continued)

OTHER PUBLICATIONS

International Search Report for corresponding PCT/IB2021/051230 mailed May 11, 2021, 12 pgs.
(Continued)

*Primary Examiner* — William R Harp
(74) *Attorney, Agent, or Firm* — RANKIN, HILL & CLARK LLP

(57) ABSTRACT

A conveying apparatus for tablet products produced by a tableting apparatus having a sliding base and a conveying mechanism, which runs over the sliding base and has a pockets for the separated products, the pockets being open in relation to the sliding base and being movable by the conveying mechanism in a conveying direction over the sliding base, the conveying apparatus includes a discharge device having an aperture, which is provided in the sliding base and encompasses a discharge portion of the conveying path, and having a movable discharge base, which is assigned to the aperture and has at least one closed base region for closing the discharge portion and at least one open through-passage region for giving the discharge portion free, wherein the movement direction of the discharge base for optionally closing or freeing the discharge portion is essentially the same as the conveying direction of the conveying mechanism.

11 Claims, 2 Drawing Sheets

(56) References Cited

U.S. PATENT DOCUMENTS 6,659,710 B2 * 12/2003 Gamberini .............. B65B 35/50
                                                                                      414/794.7
2002/0136628 A1    9/2002  Gamberini

FOREIGN PATENT DOCUMENTS

| CN | 208583328 U | 3/2019 |
| DE | 3000575 A1 | 7/1981 |
| DE | 102016109228 A1 | 11/2017 |
| EP | 2704109 B1 | 5/2016 |

OTHER PUBLICATIONS

Espacenet Bibliographic data:DE 3000575 (A1), Published Jul. 16, 1981, 1 pg.
Espacenet Bibliographic data:DE 102016109228 (A1), Published Nov. 23, 2017, 2 pgs.
Espacenet Bibliographic data:EP 2704109 (B1), Published May 11, 2016, 1 pg.
Espacenet Bibliographic data:CN 205500720(U), Published Aug. 24, 2016, 1 pg.
Espacenet Bibliographic data:CN 206966545(U), Published Feb. 6, 2018, 1 pg.
Espacenet Bibliographic data:CN 208583328(U), Published Mar. 8, 2019, 1 pg.
Chinese Office Action for corresponding CN 202180018860.6 mailed Jul. 23, 2024, 9 pgs.

* cited by examiner

CONVEYING APPARATUS FOR INDIVIDUALLY SEPARATED PRODUCTS

This Application claims priority in PCT application PCT/IB2021/051230 filed on Feb. 15, 2021, which claims priority in German Patent Application DE 10 2020 104 063.6 filed on Feb. 17, 2020, which are incorporated by reference herein.

The invention relates to a conveying device for individual products, in particular for tablet products produced using a pelleting device, with a sliding base and a conveyor element running over the sliding base with a plurality of receiving pockets for the individual products which can be moved by the conveying element in the conveying direction along a conveyor track over the sliding base.

BACKGROUND OF THE INVENTION

Such conveying devices are for example used for the removal of tablet products produced in rotary pelleting machines, the products being fed to the conveyor device from the die table of the pelleting machine and each being individually received in the receiving pockets. The receiving pockets are generally located on the outer peripheral area of the conveyor element, which is designed for example as a star conveyor, and arranged above the sliding base and driven in rotation by a drive. The system thereby conveys the products caught in the receiving pockets over the sliding base on a circular path to a discharge device.

To monitor the product quality of tablet products in the form that they can be conveyed using the invention, it is often desirable to discharge individual products from the transport path as soon as possible after their production to be able to perform suitable audit measures. The high production speed that can now be achieved on pelleting machines, which reaches several hundred tablet products per minute using a rotary pelleting machine, makes it difficult to reliably discharge an individual product without incurring the risk of it being damaged during the discharge process.

Various solutions for the discharge of individual tablet products after production in a tablet press were investigated. A simple option for taking individual samples from production is to stop production for a short time and remove one of the produced tablets through a window which is opened for access. This method of sampling while the system is at a standstill is not associated with any investment costs or adjustments to the system, and damage to the tablets is also usually avoided. Quite obviously though, this procedure is time-consuming and accordingly associated with a loss of production output which is not negligible.

Yet another approach involves the use of tablets that have already been packaged as a sample; individual tablets are thus not discharged from production at all, but rather one of the packages are reopened to obtain a sample only after production and packaging is complete. Even with this procedure, the pelleting system does not need to be changed and there is no burden on the tablet caused by the discharge process. However, the disadvantage here is that the tablet first has to go through the entire path of further processing after actual production (transport, packaging) and then has to be unpacked again, which means that a significant amount of time elapses before it can be audited after production. If any product defects are found during this audit, they can only be remedied after this time delay.

Attempts to eject individual tablets from the transport path using compressed air by blowing on them with compressed air nozzles to displacing them (laterally) from their usual conveying path have revealed various disadvantages of the method. On the one hand, a reliable supply of compressed air needs to be ensured to apply to the compressed air nozzles, and on the other hand, suitable stop guides must be provided for the tablet being blown on, so that it is not removed from the conveyor belt or another conveyor element in an uncontrolled manner. One can easily have a situation where the tablet blown sideways out of the conveyor track by means of compressed air becomes damaged when it hits the stop guide and any subsequent audit, in particular the determination of weight, then results in a defective (i.e. underweight) product, although this defect was not caused by the production of the tablet, but rather took place during discharge.

Similar problems arise when attempting to discharge a single sample tablet by applying a vacuum or by means of a mechanical diverter which deflects the tablet laterally into a sample removal channel. These measures can also easily result in damage to the discharged product.

SUMMARY OF THE INVENTION

The object of the invention is to design a conveying device of the type mentioned at the outset in such a way that it is possible to reliably discharge individual products transported with the conveying device from the conveying path as samples without damaging them in the process.

The invention achieves this object through a discharge device with a recess provided in the sliding base, which recess comprises a discharge section of the conveyor track, and with a movable discharge base dedicated to the recess with at least one closed base area for closing the discharge section and at least one open passage area for releasing the discharge section, whereas the direction of movement of the discharge base for selectively closing or releasing the ejection section is basically synchronous to the conveying direction of the conveying element.

According to the invention, the possibility of a downward discharge is thus created with the invention for ejecting individual products in the sliding base of the conveyor device over which the products are transported. During regular transport operation of the device, the sliding base is also closed at the discharge section by the closed base area of the discharge base. To discharge a product, the discharge base is moved in order to release the discharge section by bringing the open passage scope under the product to be discharged. The direction of movement of the discharge base, which according to the invention will be synchronous with the conveying direction of the conveying element, ensures that the largest possible time interval is available for the opening and closing movement, because the opening and closing edges of the discharge base that limit the passage area and are at the front and rear in the direction of movement move at least essentially in the same direction as the stream of tablets transported over the slide base. The product to be discharged therefore has sufficient time to fall down through the sliding base through the temporary opening created in the base, for example onto a product chute provided on which the product can slide further on, driven by gravity.

An advantageous design of the invention would involve that the discharge base is formed by a circular disk driven by rotation with at least one base window forming the passage area. According to the invention, the circular disk is rotated in such a direction that the base window, which is placed under the product to be discharged to open the discharge device, moves at least essentially in the same direction as the product.

The discharge base is preferably arranged coplanar to the sliding base at least partially in the recess provided therein, so that a stepless transition is ensured between the discharge base and the sliding base, over which the products transported can be moved without damage.

It is advantageous if the discharge floor can be driven at a movement speed synchronous to the conveying speed of the conveying element. This makes it possible to minimize the relative speed of the passage area in relation to the conveying speed of the products moved over the sliding base and thus to maximize the time during which the discharge device is open to remove a product from the flow of products.

In a manner known per se, the conveying element can be a rotating conveying star which is arranged above the sliding base and at which the receiving pockets are formed on its radially outer peripheral scope. The discharge base can be driven by means of a discharge drive which can be derived from a drive for the conveying element. The arrangement can be made in such a manner that the discharge drive can be coupled to the drive for conveying element by means of a gear that can be engaged and disengaged. However, it is also possible to provide a separate drive for the discharge base that is independent of the conveyor element drive, such as a pneumatic drive or a servomotor. In a preferred embodiment of the invention, the drive for the discharge base is implemented by means of a pneumatic cylinder, which is coupled via a freewheel ratchet gear in such a way that during a complete working stroke of the cylinder, it rotates by a fixed, specific angular amount, for example by 90° in the desired direction of rotation and remains in its position during the opposite stroke of the cylinder. In this way, by actuating and retracting the pneumatic cylinder several times, in particular four times, the discharge base can be rotated completely in a corresponding number of steps and returned to its original position, whereby each base window provided in the discharge base which is opened once during this single rotation to discharge an article accesses the recess in the sliding base and releases the discharge section. The working speed of the pneumatic cylinder, i.e. the speed at which its piston rod extends or retracts, shall be preferably adapted to the conveying speed at which the products are conveyed over the sliding base so that the discharge base or the discharge window formed therein moves along at basically the same speed moves in at least approximately the same direction as the discharged product moved by the conveying element.

The discharge device shall be preferably provided with a product chute which is arranged below the discharge section and which a product accesses from above when the discharge base is in position upon releasing the discharge section. The discharge device is expediently arranged between a feeder device for the products onto the sliding base and a removal device for the products downstream of the feeder device in the conveying direction. The feeder device can be formed at least in part by the die table of a pelleting device. The removal device shall preferably be essentially formed by a base opening provided in the sliding base through which the products moved by the conveyor element over the sliding base can fall down at the end of their conveying path, for example onto a subsequent conveyor belt or onto a discharge chute.

These and other objects, aspects, features and advantages of the invention will become apparent to those skilled in the art upon a reading of the Detailed Description of the invention set forth below taken together with the drawings which will be described in the next section.

BRIEF DESCRIPTION OF THE DRAWINGS

The invention may take physical form in certain parts and arrangement of parts, a preferred embodiment of which will be described in detail and illustrated in the accompanying drawings which forms a part hereof and wherein.

DESCRIPTION OF PREFERRED EMBODIMENTS

Figure 1:
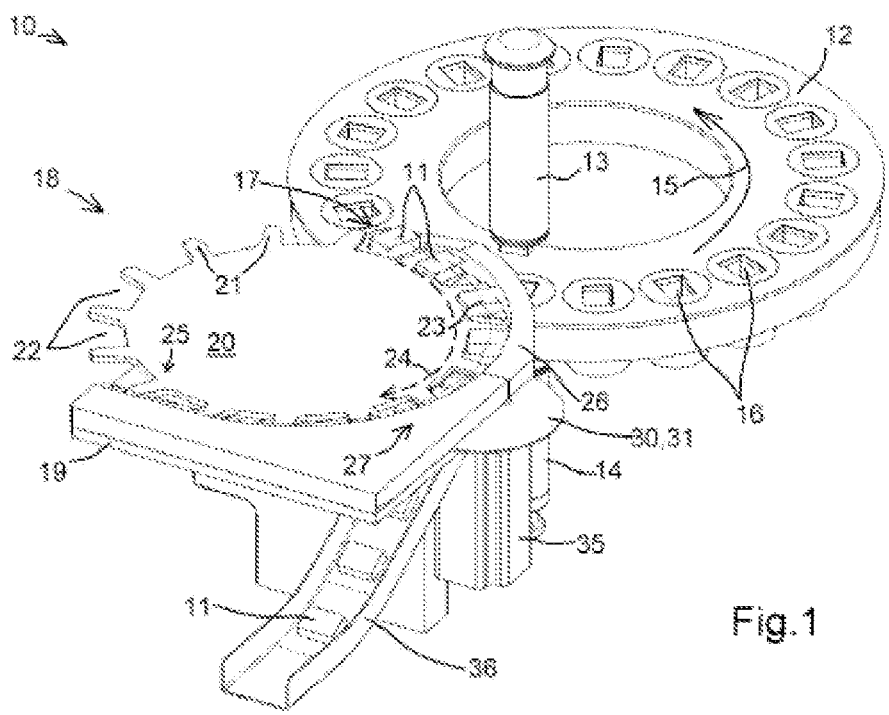
FIG. 1 a pelleting system with a device according to the invention in a simplified perspective view.

Referring now to the drawings wherein the showings are for the purpose of illustrating preferred and alternative embodiments of the invention only and not for the purpose of limiting the same, in the figures, 10 designates a pelleting system which is used for the production of tablet products, for example detergent tablets 11. System 10 comprises a rotary tablet press, as is known in state of the art for the production of compressed products made from powder. Since the structure of such tablet presses is familiar to skilled persons, only one die plate 12, as well as by way of example, a pair of die punches with upper punch 13 and lower punch 14, are presented from the tablet press in the drawings. The products 11 pressed by the pair of die punches in the associated die opening 16 during one revolution of the die plate 12 in the direction of rotation 15 are pushed upwards out of their die opening 16 by the respective lower punch 14 at the end of a revolution of the die table 12 and transferred to a feed device 17 of a conveyor device, which is the subject of the present invention.

The conveyor device, designated 18 as a whole, has a sliding base 19, the top of which is at the same level as the top of the die plate 12 and which is provided with a boundary surface in the shape of a segment of a circle, along which die plate 12 runs in the scope of feed device 17. A revolving conveying element in the form of a conveying star 20 is arranged so as to be rotatable about a vertical axis just above sliding base 19. The star conveyor 20 has multiple carrier fingers 21 provided on its outer circumference projecting radially outwards, which form receiving pockets 22 between themselves for the products 11. The receiving pockets 22 are open at the bottom towards the sliding base 19, so that the products 11, which are taken over by the die plate 12, are pushed in a circular conveyor track 23 in conveying direction 24, starting from the feed device 17 over an angular range of about 180° towards a removal device 25 over the sliding base 19 of device 18. One can see that the carrier fingers 21 in the scope of feed device 17 project laterally beyond the boundary surface drafted in the form of circle segment to the upper side of the die plate and can thereby take over the products from it. The lateral guiding of the tablet products 11 along the conveyor track 23 on the outside of the receiving pockets 22 open on the periphery is achieved by a stationary guide rail 26 in the shape of a circle segment, which extends from the feeder device 17 to the removal device 25 and which delimits the circular arc-shaped conveyor track 23 on the outside.

Approximately halfway between the feeder device 17 and the removal device 25, device 18 is provided with a discharge device 27, with which one or more of the products 11 can be discharged from the conveyor track 23 in order to be able to audit them as a product sample, for example. The discharge device 27 can best be seen in FIGS. 2 and 3, where the guide rail 26 in the shape of a circle segment is not shown.

Figure 4:
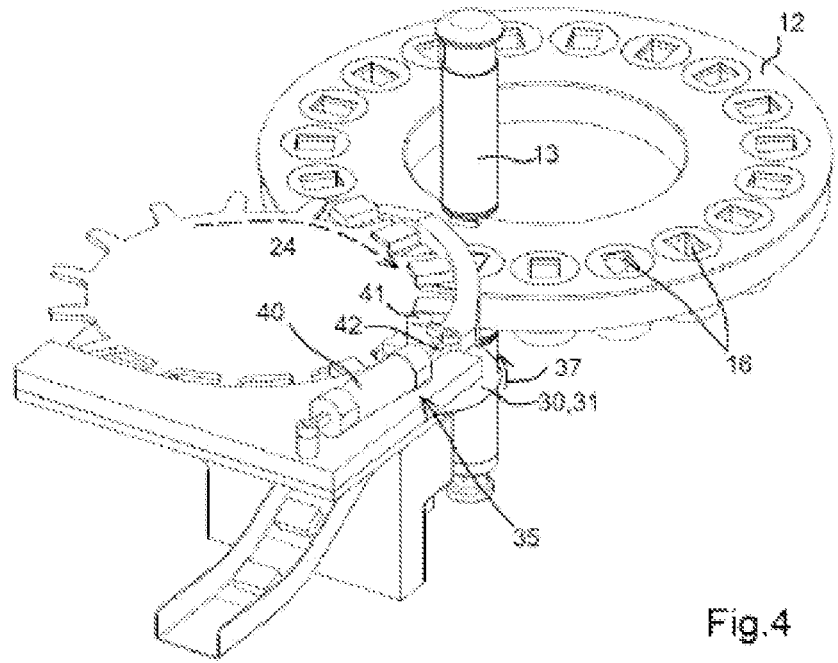
FIG. 4 another embodiment of the pelleting system with an alternative drive for the discharge base of the discharge device in a representation corresponding to FIG. 1.

As can be seen, the discharge device 27 comprises a recess 28 provided in the sliding base 19 in discharge section 29 of the conveyor track 23 and a movable discharge base 30 dedicated to recess 28, which in the preferred exemplary embodiment shown is formed by a rotation-driven circular disk 31. It has a closed base area 32 extending over a circumferential angle of about 270° for closing the discharge section 29 and an open passage area 33 in the form of a base window 34 with which the ejection section can be released. The circular disk can be rotated about a vertical axis with a drive 35 coupled to the discharge base 30. In the embodiment shown in FIG. 1, this drive consists of a servomotor arranged below the discharge base to the output shaft of which the circular disk forming the discharge base is flanged either directly or with the interposition of a gearing. In the embodiment example shown in FIG. 4, the drive for the discharge base is essentially formed using a pneumatic cylinder 40, which always advances the discharge base by a quarter of a turn via a (simplified) ratchet gear 41 coupled to the rotary shaft of the discharge base 30 when the piston rod 42 extends during actuation of the cylinder. The ratchet mechanism provided in the ratchet gear, not shown in detail, ensures that the discharge base maintains its position when the piston rod is retracted, i.e. when it is not turned back again. The reciprocating movement of the piston rod of the cylinder is thus converted into a rotary indexing movement of the discharge base in one direction of rotation, with four consecutive, complete working strokes of the pneumatic cylinder in the illustrated embodiment, causing a complete rotation of the discharge base back to its starting position.

By means of the drive 35, either the closed base area 32 of the discharge base 30 is arranged in recess 28 in order to thereby close discharge section 29, or the open passage area 33 is brought into the recess 28 to thereby open the discharge section 29, so that the product 11 arriving on the conveyor track 23 then descends onto a discharge chute 36 beginning below the discharge section 29, which discharges the product from conveyor device 18. The direction of movement of discharge base 30 in the area of recess 28, that is the circumferential direction 37 of circular disc 31 below the recesses in the conveyor star in the exemplary embodiments, for selectively closing or releasing discharge section 29 is, according to the invention, essentially the same as conveying direction 24 of conveyor element 20. This particular configuration has the advantage that when the circular disk rotates, the essentially radially extending front and rear window edges 38 that delimit the bottom window 34 in the circumferential direction at the front and rear do not move counter to the conveying direction 24 of the tablets 11, but rather in essentially the same direction, so a situation does not occur in which the tablet to be discharged from conveyor device 18 at the discharge device 27 between the carrier fingers 21 of the conveyor star 20 or the edges of the recess 28 and the window edges 38 of the base window 34 in the discharge base 30 is jammed and thereby damaged.

Figure 2:
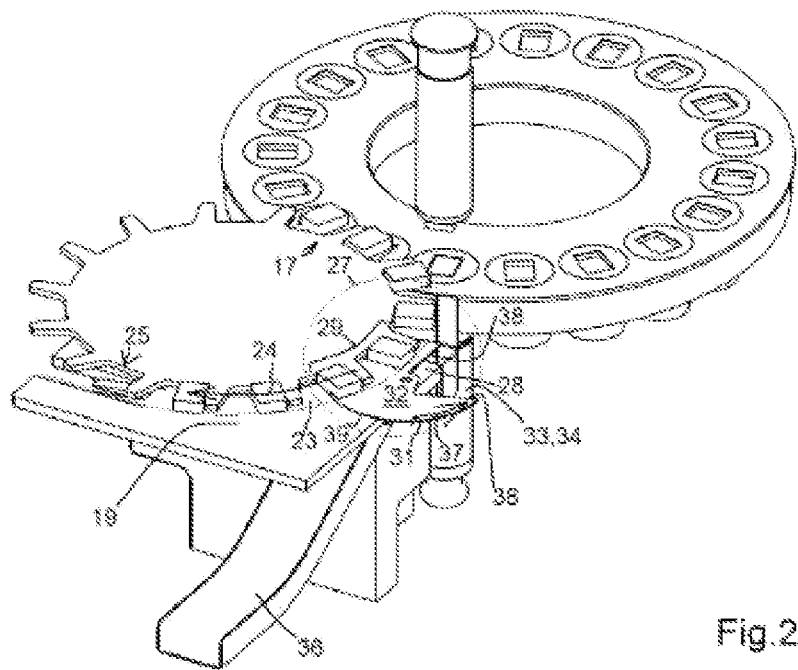
FIG. 2 the object according to FIG. 1 with the omission of parts of the device according to the invention with a closed discharge section, in a perspective view.
Figure 3:
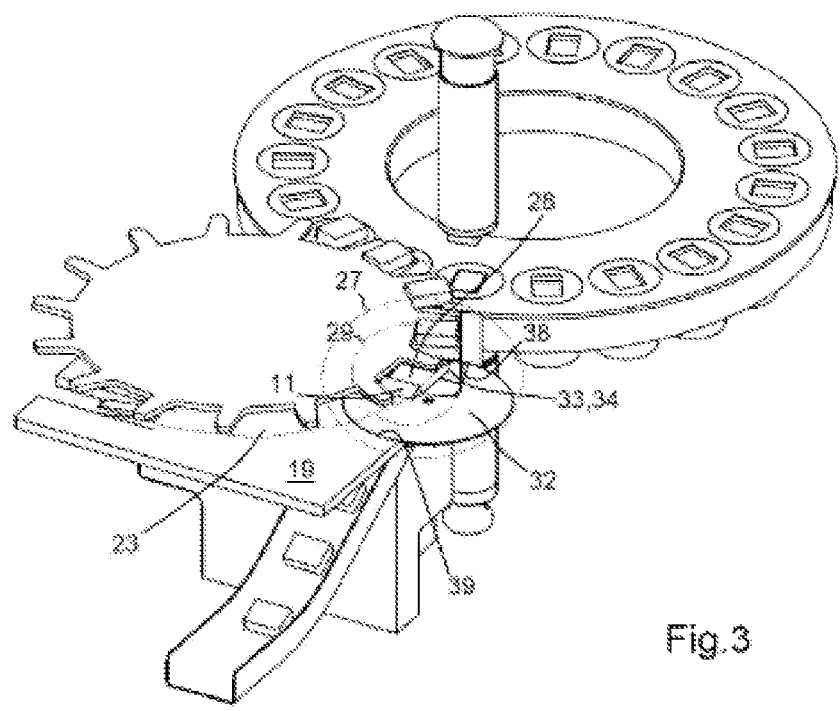
FIG. 3 the object according to FIG. 1 with open discharge section.

One can clearly see in FIGS. 2 and 3 that the discharge base 30 is arranged coplanar to the sliding base 19, i.e. the upper side of its base scope is at the same height as the upper side of the sliding base. In the closed state of the discharge device shown in FIG. 2, in which the base area 32 is in recess 28 in the sliding base 19, the products 11 are moved continuously by the star conveyor 20 over the narrow gap 39 between the sliding base and the discharge base. The recess 28 in the sliding base has the approximate shape of a semicircle, which is essentially completely filled by the circular disc 31 forming discharge base 30 when discharge device 27 is closed, forming only a very narrow gap 39. The discharge base 30 can be rotated or advanced by the servomotor 35 or the pneumatic cylinder drive 40, 41 at a movement speed synchronous to the conveying speed of the conveyor star wheel 20, in order in this way to place the bottom window 34 of the circular disc 31 in the recess 28 (FIG. 3) and thereby to open the ejection section 29 for a product, which then passes down onto the discharge chute 36 and is thus withdrawn from the regular conveying path. Needless to say, it is also possible to remove several products, for example as a series of samples, for which purpose it is possible, particularly in the embodiment according to FIG. 4, to either keep the discharge base in its open position for a correspondingly longer time, so that correspondingly several products following one another are removed, or—especially with the embodiment according to FIG. 1, to rotate the discharge base over several revolutions at a rotational speed adapted to the conveying speed of the conveyor star wheel in such a way that the base window comes under a product deposited in a receiving pocket with each rotation of the discharge base and then, for example, every second, third or nth of the products located in the adjacent receiving pockets from the regular conveyor track between the feeder device and the discharge device is already discharged at the discharge device.

Of course, with a correspondingly different design of the discharge device and in particular discharge base, other types of sampling can also be implemented. The discharge base can also be fitted with several base windows, for example, which alternate with correspondingly large, closed base areas. Such a design can then be useful if we need to ensure that, for example, every second product manufactured in the pelleting machine should be diverted to a different location. It is also possible to design the discharge device not with a rotating circular disk as the discharge base, but for example with a flexible drive element rotating around two deflection rollers or chain stars, for example a link chain, on which one or more closing plates are arranged projecting laterally, which can be moved into the recess in the base floor to close it.

While considerable emphasis has been placed on the preferred embodiments of the invention illustrated and described herein, it will be appreciated that other embodiments, and equivalences thereof, can be made and that many changes can be made in the preferred embodiments without departing from the principles of the invention. Furthermore, the embodiments described above can be combined to form yet other embodiments of the invention of this application. Accordingly, it is to be distinctly understood that the foregoing descriptive matter is to be interpreted merely as illustrative of the invention and not as a limitation.

The invention claimed is:

1. A conveying device for tablet products produced using a pelleting device, with a sliding base and a conveyor element running over the sliding base with a plurality of receiving pockets for the individual products which can be moved by the conveyor element in the conveying direction along a conveyor track over the sliding base, wherein a discharge device with a recess in the sliding base which recess comprises a discharge section of the conveyor track, and with a movable discharge base dedicated to the recess with at least one closed base area for closing the discharge section and at least one open passage area for releasing the discharge section, whereas the direction of movement of the discharge base for selectively closing or releasing the discharge section is synchronous to the conveying direction of the conveyor element, wherein the discharge base is formed by a circular disc driven by rotation with at least one base window forming the passage area.

2. The conveying device according to claim 1, wherein the discharge base is arranged coplanar with the sliding base at least in part in the recess provided in the sliding base.

3. The conveying device according to claim 1, wherein the discharge base is drivable at a movement speed synchronous with the conveying speed of the conveyor element.

4. The conveying device according to claim 1, wherein the discharge base is drivable by a discharge drive which can be derived from a drive for the conveyor element.

5. The conveying device according to claim 1, wherein the discharge device is equipped with a discharge chute arranged below the discharge section.

6. The conveying device according to claim 1, wherein the discharge device is arranged between a feeder device for the products on the sliding base and a removal device for the products in the conveying direction downstream of the feeder device.

7. The conveying device according to claim 6, wherein the feeder device is formed at least partially by a die table of a pelleting device.

8. The conveying device according to claim 7, wherein the discharge device is basically formed by a base opening provided in the sliding base.

9. The conveying device according to claim 6, wherein the discharge device is basically formed by a base opening provided in the sliding base.

10. A conveying device for tablet products produced using a pelleting device, with a sliding base and a conveyor element running over the sliding base with a plurality of receiving pockets for the individual products which can be moved by the conveyor element in the conveying direction along a conveyor track over the sliding base, wherein a discharge device with a recess in the sliding base which recess comprises a discharge section of the conveyor track, and with a movable discharge base dedicated to the recess with at least one closed base area for closing the discharge section and at least one open passage area for releasing the discharge section, whereas the direction of movement of the discharge base for selectively closing or releasing the discharge section is synchronous to the conveying direction of the conveyor element, wherein the conveyor element is a conveying star being rotatably arranged above the sliding base and on the radially outer peripheral area of which the receiving pockets are formed.

11. A conveying device for tablet products produced using a pelleting device, with a sliding base and a conveyor element running over the sliding base with a plurality of receiving pockets for the individual products which can be moved by the conveyor element in the conveying direction along a conveyor track over the sliding base, wherein a discharge device with a recess in the sliding base which recess comprises a discharge section of the conveyor track, and with a movable discharge base dedicated to the recess with at least one closed base area for closing the discharge section and at least one open passage area for releasing the discharge section, whereas the direction of movement of the discharge base for selectively closing or releasing the discharge section is synchronous to the conveying direction of the conveyor element, wherein the discharge base is drivable by a discharge drive which can be derived from a drive for the conveyor element, wherein the discharge drive is couplable to the drive for the conveyor element by means of a gear which can be engaged and disengaged.

\* \* \* \* \*